United States Patent
Fukai et al.

(10) Patent No.: US 6,918,268 B2
(45) Date of Patent: Jul. 19, 2005

(54) PLATE-SHAPED MEMBER POSITIONING APPARATUS AND GLASS SHEET BENDING APPARATUS

(75) Inventors: Takaaki Fukai, Kanagawa (JP); Toshimitsu Sato, Aichi (JP); Kenji Maeda, Kanagawa (JP); Tomohiro Hoshino, Kanagawa (JP); Jun Saito, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 453 days.

(21) Appl. No.: 10/138,636

(22) Filed: May 6, 2002

(65) Prior Publication Data
US 2002/0166344 A1 Nov. 14, 2002

(30) Foreign Application Priority Data
May 9, 2001 (JP) .......................... 2001-138798

(51) Int. Cl.[7] .................................. C03B 23/03
(52) U.S. Cl. ................. 65/289; 65/253; 65/323
(58) Field of Search ..................... 65/323, 106, 287, 65/289, 253, 254

(56) References Cited

U.S. PATENT DOCUMENTS

| | | | |
|---|---|---|---|
| 4,895,244 A | | 1/1990 | Flaugher et al. |
| 4,956,001 A | * | 9/1990 | Kitagawa et al. ............. 65/107 |
| 4,985,059 A | * | 1/1991 | Letemps et al. ................ 65/62 |
| 5,009,695 A | * | 4/1991 | Kuster et al. ............... 65/182.2 |
| 5,028,250 A | * | 7/1991 | Deb et al. ...................... 65/289 |
| 5,066,321 A | * | 11/1991 | Kramer et al. ............. 65/182.2 |
| 5,330,549 A | * | 7/1994 | Carlomagno et al. ...... 65/182.2 |
| 5,403,369 A | * | 4/1995 | McMaster .................... 65/25.4 |
| 5,411,128 A | * | 5/1995 | Vild et al. ............... 198/345.1 |
| 5,693,112 A | * | 12/1997 | Lesage et al. ................ 65/106 |
| 5,902,366 A | * | 5/1999 | Schnabel et al. ............ 65/17.1 |
| 2003/0182969 A1 | * | 10/2003 | Dunifon ...................... 65/323 |

FOREIGN PATENT DOCUMENTS

| | | |
|---|---|---|
| EP | 0 389 316 | 9/1990 |
| JP | 6-247729 | 9/1994 |

\* cited by examiner

*Primary Examiner*—Steven P. Griffin
*Assistant Examiner*—Carlos Lopez
(74) *Attorney, Agent, or Firm*—Oblon, Spivak, McClelland, Maier & Neustadt, P.C.

(57) ABSTRACT

There is provided a plate-shaped member positioning apparatus comprising a conveyor for conveying a plate-shaped member, a positioner for contact with a front end of a conveyed plate-shaped member, a moving unit for moving the positioner along a conveyance direction of the plate-shaped member, and a controller for controlling operations of the conveyor and the moving unit; wherein the controller moves the plate-shaped member in the conveyance direction with the positioner kept in contact with the front end of the plate-shaped member, decelerates an advancing speed of the plate-shaped member and positions the plate-shaped member at a certain standby position.

6 Claims, 9 Drawing Sheets

PLATE-SHAPED MEMBER POSITIONING APPARATUS AND GLASS SHEET BENDING APPARATUS

The present invention relates to a plate-shaped member positioning apparatus and a glass sheet bending apparatus.

There have been known bending apparatuses, wherein a glass sheet, which has been heated to a temperature near to the softening point in a heating furnace, is pressed against a forming die. The bending apparatuses are broadly classified as out-of-furnace bending apparatuses with a forming die provided outside or in-furnace bending apparatuses with a forming die provided in a furnace. In the case of the in-furnace bending apparatuses, there is no problem due to a reduction in temperature during bending since a glass sheet is bent with the heating temperature kept. In the case of the out-of-furnace bending apparatuses, it is necessary to bend a glass sheet and temper the glass sheet by air-cooling in a short time since the temperature of the glass sheet is gradually lowered by the ambient temperature.

An example of the out-of-furnace bending apparatuses is disclosed in JP-A-6-247729. This out-of-furnace bending apparatus is applied to an apparatus for bending an automobile side windowpane. In this apparatus, a glass sheet, which has been carried out of the outlet of a heating furnace by rollers, is pushed by positioners to be positioned at a positioning location to a forming die. After that, the glass sheet is put on a press ring forming a part of the forming die, and the glass sheet is pushed against the forming die by an upward movement of the press ring to be bent into a desired shape. The glass sheet thus bent is conveyed into an air-cooling and tempering apparatus, being put on the press ring, and is tempered by blowing cooling air thereto.

As explained, the positioning apparatus in the conventional out-of-furnace bending apparatuses brings the positioners into contact with the rear end of a glass sheet in the conveyance direction and moves the positioners toward the convenience direction to position the glass sheet. As a result, the out-of-furnace bending apparatuses with that sort of positioning apparatus applied thereto have needed to ensure a sufficient moving space for the positioners between the outlet of the heating furnace and the positioning location to the forming die. Because of this arrangement, there have been the danger that the temperature of the glass sheet is lowered during conveyance between the outlet of the heating furnace and the positioning location far therefrom to create a problem in the bending operation.

In particular, automobile glass sheets have a tendency to be thinned (a thickness t=not greater than 2.8 mm) for recent years. From the viewpoint that thinner glass sheets are cooled more rapidly, how to bend a glass sheet carried out of a heating furnace in a short period of time is a key issue in the future.

The present invention has been proposed in consideration of the circumstances. It is an object of the present invention to provide a plate-shaped positioning apparatus and a glass sheet bending apparatus, which can be installed in a narrower space than the conventional apparatuses and shorten the time required up to the bending operation of a glass sheet after carrying the glass sheet out of a heating furnace.

In order to attain the object, the present invention provides a plate-shaped member positioning apparatus comprising a conveyor for conveying a plate-shaped member, a positioner for contact with a front end of a conveyed plate-shaped member, a moving unit for moving the positioner along a conveyance direction of the plate-shaped member, and a controller for controlling operations of the conveyor and the moving unit; wherein the controller moves the plate-shaped member in the conveyance direction with the positioner kept in contact with the front end of the plate-shaped member, decelerates an advancing speed of the plate-shaped member and positions the plate-shaped member at a certain standby position.

Additionally, the present invention provides a plate-shaped member positioning apparatus comprising a roller conveyor for conveying a plate-shaped member, a guide rail, a guide block slidably provided on the guide rail, a support provided on the guide block; a four-bar linkage provided to the support, an arm provided to the four-bar linkage so as to be able to extend in a horizontal direction; an air cylinder for changing a form of the four-bar linkage, and a controller for controlling an operation of the roller conveyor, a sliding movement of the guide block and an operation of the air cylinder; wherein the four-bar linkage comprises a first link fixed to the support, a second link coupled to one end of the first link with a pin, a third link coupled to one end of the second link with a pin, and a fourth link coupled to one end of the third link with a pin and to the other end of the first link with a pin; the second link includes a tongue coupled to a piston of the air cylinder; and the controller operates the air cylinder to move the arm to a certain initial position for a positioning operation, moves a plate-shaped member in a conveyance direction thereof with a leading end of the arm kept in contact with a front end of the plate-shaped member and positions the plate-shaped member at a certain standby position.

Further, the present invention provides a glass sheet bending apparatus comprising a heating furnace for heating a glass sheet up to a certain bending temperature, a mold having a certain bending shape, a conveyor for conveying the heated glass sheet, a positioning unit for positioning the conveyed glass sheet at a certain glass sheet standby position, and a press ring for pressing the conveyed glass sheet against the mold to bend the glass sheet after receiving the glass sheet at the glass sheet standby position; wherein the positioning unit comprises a positioner for contact with a front end of the conveyed plate-shaped member, a moving unit for moving the positioner along a conveyance direction of the glass sheet, and a controller for controlling operations of the conveyor and the moving unit; the controller moves the glass sheet in the conveyance direction with the positioner kept in contact with the front end of the glass sheet and positions the glass sheet at the standby position.

Still further, the present invention provides a glass sheet bending apparatus comprising a heating furnace for heating a glass sheet up to a certain bending temperature, a mold having a certain bending shape, a roller conveyor for conveying the heated glass sheet, a positioning unit for positioning the conveyed glass sheet at a certain glass sheet standby position, and a press ring for pressing the conveyed glass sheet against the mold to bend the glass sheet after receiving the glass sheet at the glass sheet standby position; wherein the positioning unit comprises a guide rail, a guide block slidably provided on the guide rail, a support provided on the guide block; a four-bar linkage provided to the support, an arm provided to the four-bar linkage so as to be able to extend in a horizontal direction; an air cylinder for changing a form of the four-bar linkage, and a controller for controlling an operation of the roller conveyor, a sliding movement of the guide block and an operation of the air cylinder; the four-bar linkage comprises a first link fixed to the support, a second link coupled to one end of the first link with a pin, a third link coupled to one end of the second link with a pin, and a fourth link coupled to one end of the third link with a pin and to the other end of the first link with a pin; the second link includes a tongue coupled to a piston of the air cylinder; and the controller operates the air cylinder to move the arm to a certain initial position for a positioning operation, moves the glass sheet in a conveyance direction thereof with a leading end of the arm kept in contact with a front end of the glass sheet and positions the glass sheet at a certain standby position.

In accordance with the present invention, the positioner moving space between the outlet of a heating furnace and the glass sheet standby position can be eliminated to bring a forming die near the outlet of the heating furnace by bringing the positioner in contact with the front end of the glass sheet in the conveyance direction to position the glass sheet. By this arrangement, the heated glass sheet can be bent in excellent fashion since the temperature decrease in the glass sheet can be restrained.

Now, a preferred embodiment of the glass sheet bending apparatus according to the present invention will be described in detail in reference to the accompanying drawings.

Figure 1:
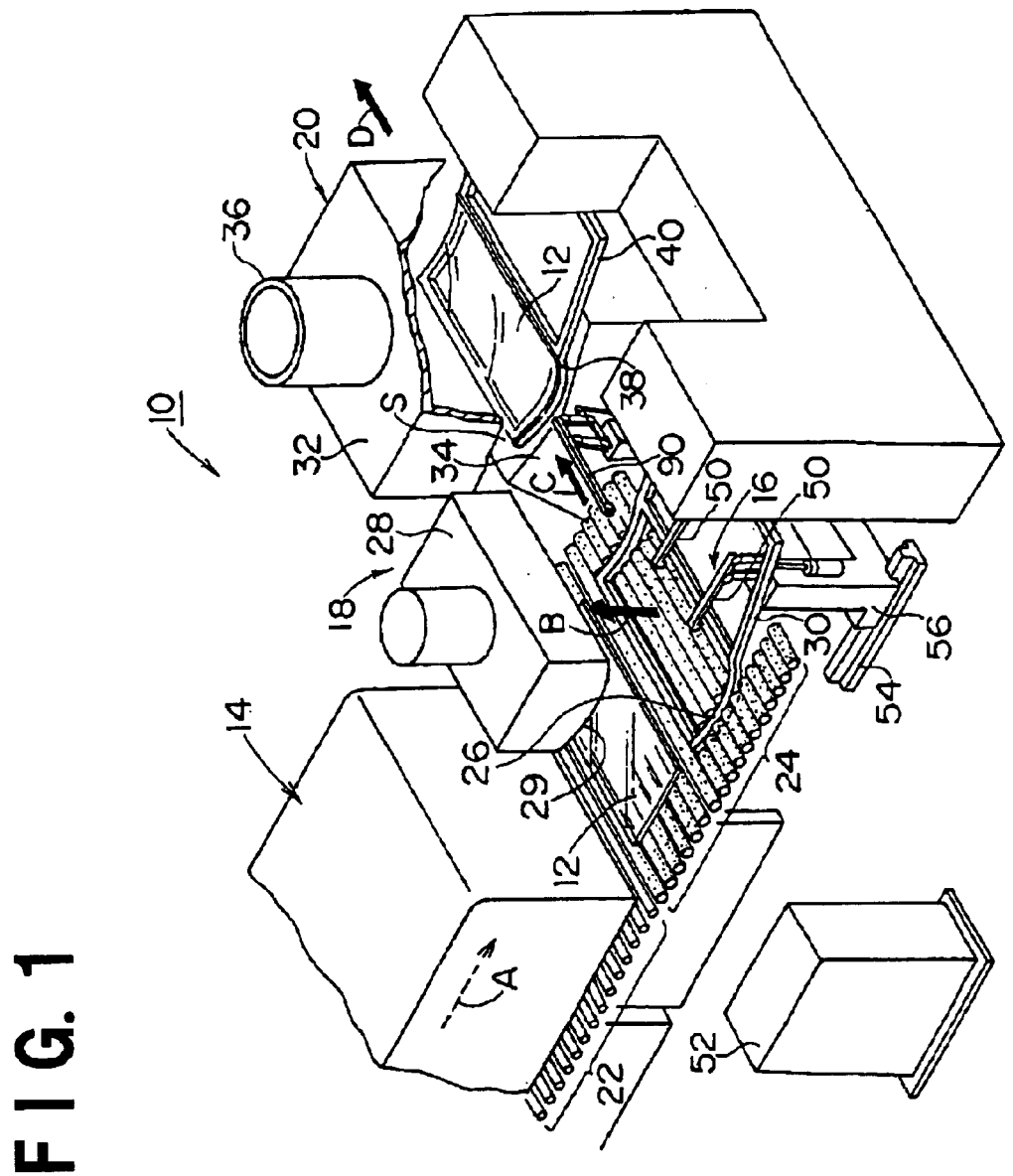
FIG. 1 is a perspective view showing the structure of a glass sheet bending apparatus according to the present invention.

The bending apparatus for an automobile glass sheet 10 shown in FIG. 1 is configured to include a heating furnace 14, a positioning apparatus (corresponding to the positioning unit recited in claims) 16, a forming die 18 and an air-cooling and tempering apparatus 20 in the order from the upstream side toward the downstream side of the conveyance direction of a glass sheet 12.

Figure 2:
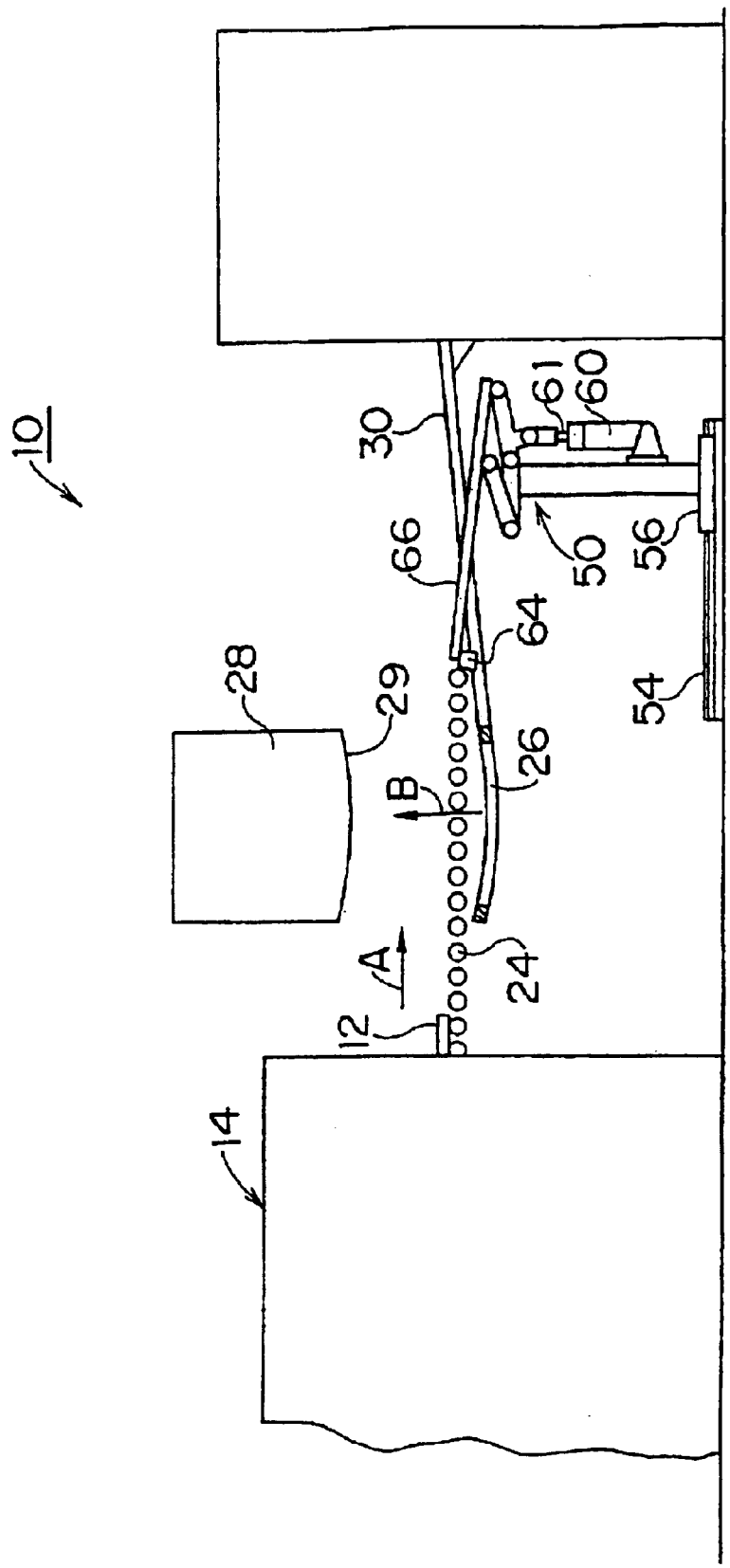
FIG. 2 is a side view of the glass sheet bending apparatus shown in FIG. 1.

The heating furnace 14 has a roller conveyer 22 provided so as to extend therein and outward. The glass sheet 12 to be bent is conveyed in the heating furnace 14 in a direction A indicated by an arrow in FIG. 1 by the roller conveyer, and the glass sheet is heated to have a temperature near to the softening point (680° C.–690° C.) at the outlet of the heating furnace 14. The heated glass sheet 12 is conveyed from the outlet of the heating furnace 14 toward a certain glass sheet standby position (just under a mold 28 in this figure) to the forming die 18 by a roller conveyer 24 provided downstream, and the glass sheet is positioned at the glass sheet standby position by the positioning apparatus 16. As shown in FIG. 2, the glass sheet 12 is transferred onto a press ring 26 by lifting the press ring 26 from a position under the roller conveyer 24 toward the direction B indicated by an arrow in FIG. 2, the glass sheet is further lifted, being put on the press ring 26 (see FIG. 8), and the glass sheet is pressed against a lower surface 29 of the mold 28. As the result, the glass sheet 12 is formed in a desired shape to conform with the curved shape of the lower surface 29 of the mold 28.

The roller conveyer 22 in the heating furnace 14 shown in FIG. 1 comprises heat-resisting rollers, such as silica rollers. On the other hand, the roller conveyer 24 outside the heating furnace 14 comprises soft rollers, which comprise iron bars with heat-resisting unwoven cloth (for example, ceramic felt). Even if the glass sheet 12 goes into a slide on the rollers of the latter roller conveyer, no damage is caused on the surface of the glass sheet 12.

The press ring 26 and the mold 28 form the forming die 18. The press ring 26 is formed in a frame-shaped structure in conformity with the outline of the glass sheet 12. The press ring also works as a quench ring since the press ring conveys the bent glass sheet 12 to the air-cooling and tempering apparatus 20, carrying the glass sheet thereon.

After the press ring 26 is withdrawn to a position between the mold 28 and the roller conveyer 24, the bent glass sheet 12 is moved in the direction C indicated by an arrow in FIG. 1, being carried on the press ring 26, to be conveyed into the air-cooling and tempering apparatus 20. The press ring 26 horizontally moves along with a shuttle 30.

The air-cooling and tempering apparatus 20 has an upper portion provided with an upper outlet head 32 and a lower portion provided with a lower outlet head 34 so as to sandwich a glass treatment stage S therebetween. The upper outlet head 32 and the lower outlet head 34 have ducts 36 (only the duct 36 of the upper outlet head 32 is shown) connected thereto, and the ducts 36 are connected to a blower (not shown). The cooling air supplied from the blower is ejected from the upper outlet head 32 and the lower outlet head 34 toward the glass treatment stage S through the ducts 36. Thus, the glass sheet 22 has both surfaces cooled to be tempered.

At the time, the glass sheet 12 is air-cooled and tempered in air-floating fashion since the air pressure by the lower outlet head 34 is set at a higher value than the air pressure by the upper outlet head 32. In the meantime, the press ring 26 is returned to a forming position under the mold 28. In synchronism with the returning movement of the press ring 26, a catch ring 38 is introduced into the glass treatment stage S in the air-cooling and tempering apparatus 20, and the glass sheet 12 after quenching is put on the catch ring 38. The catch ring 38 is moved toward a roller conveyer, not shown, by the movement of a shuttle 40 in the direction D indicated by an arrow in FIG. 1. The glass sheet 12 is carried on the roller conveyer to be conveyed toward an inspection process, not shown. In the inspection process, the glass sheet 12 is inspected for defects, such as a crack. When the glass sheet is not defective, the glass sheet is conveyed to a process for nondefective articles. When the inspection reveals that the glass sheet is defective, the glass sheet is conveyed to a process for defective articles.

Now, the positioning apparatus 16 in the embodiment will be explained. The conventional apparatus has the positioners brought into contact with the rear end of a glass sheet in the conveyance direction to position the glass sheet. On the other hand, the positioning apparatus 16 in the embodiment has positioners brought into contact with the front end of a glass sheet in the conveyance direction to position the glass sheet.

Because of this difference, the conventional apparatus needs to ensure the positioner moving space between the outlet of the heating furnace and the positioning location, which is disadvantage in forming a glass sheet. On the other hand, the positioning apparatus 16 according to the embodiment can bring the forming die near the outlet of the heating furnace since the moving space that has been indispensable can be eliminated. By this arrangement, the positioning apparatus 16 can bend the heated glass sheet 12 in excellent fashion since the bending operation can be carried out, restraining the temperature in the glass sheet 12 from lowering.

Now, the structure of the positioning apparatus 16 will be described. The positioning apparatus 16 includes the positioners 50, 50 in one pair, which are provided at a downstream end of the roller conveyer 24 so as to have a narrower distance than the longitudinal length of the glass sheet 12 therebetween. The positioners 50, 50 are controlled by an unshown controller (corresponding to the controller defined in claims) built in a control panel shown in FIG. 1 such that both positioners carry out the same movement in synchronism with the conveyance timing of the glass sheet 12 and the conveyance speed of the roller conveyer 24.

The positioners 50 are provided, through guide blocks 56, on guide rails 54, which are provided along the glass sheet conveyance direction under the roller conveyer 24. The positioners 50 have, e.g., the guide blocks 56 engaged with the feed screws of an unshown feed screw unit (corresponding to the moving unit defined in Claims), which are provided along the glass sheet conveyance direction. The controller controls a servo motor of the feed screw unit to slide the positioners 50 at a certain speed in the glass sheet conveyance direction or the opposite direction.

Figure 3:
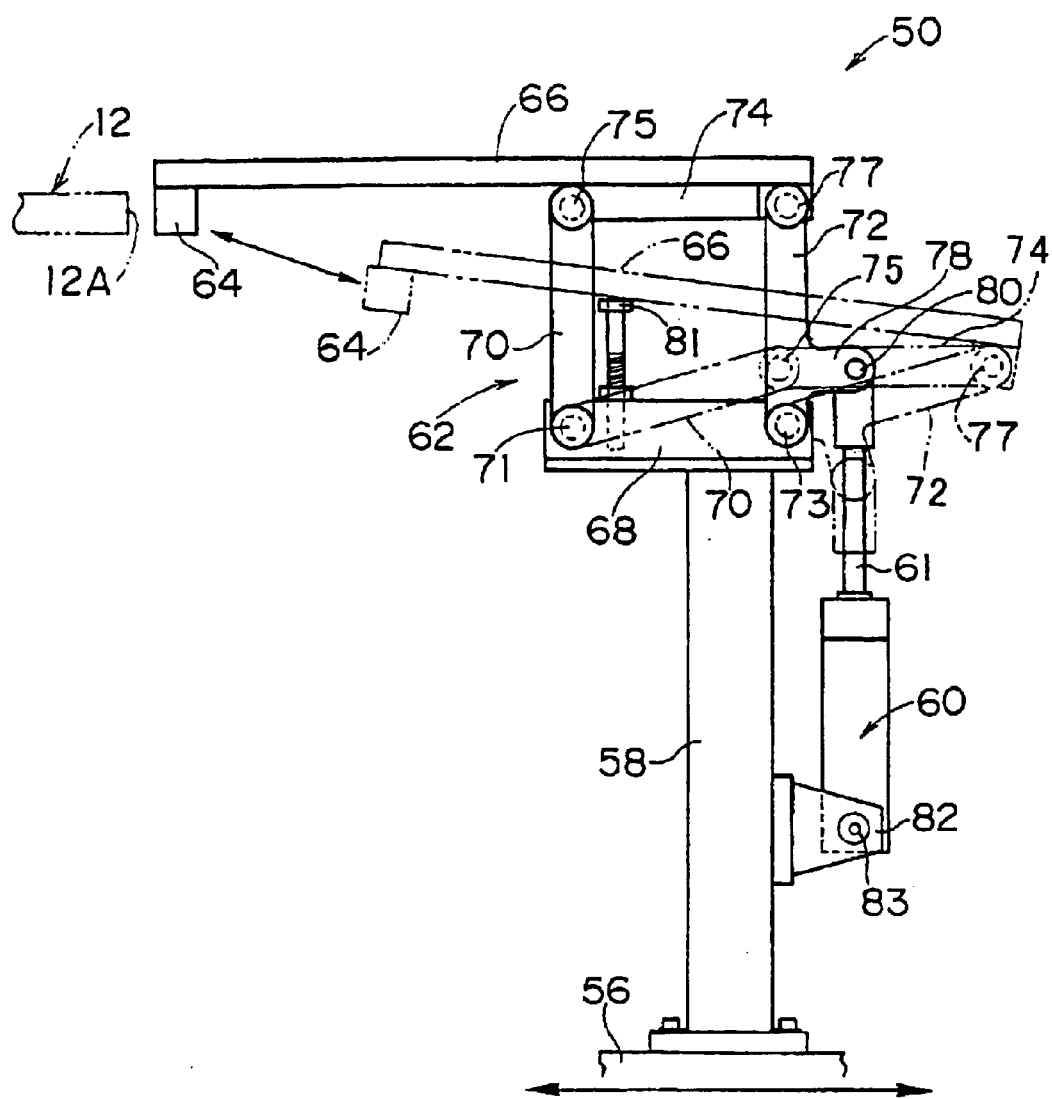
FIG. 3 is a side view showing the structure of positioners according to the present invention.

Each of the positioners 50 includes a support 58 set up on the corresponding guide block 56 as shown in FIG. 3. The support 58 is provided with a linkage 62, which carries out a parallel motion under the action of an air cylinder (corresponding to the moving unit defined in claims) 60. The linkage 62 has an arm 66 coupled thereto so as to be swingable through a pin 77, the arm including a pad 64 for contact with the front end 12A of the glass sheet 12. The pad 64 is made of heat-resisting rubber or another material. The pad 64 and the arm 66 may be in one piece, for instance.

The linkage 62 is a four-bar linkage, which comprises four links 68, 70, 72 and 74. The link 68 is fixed to an upper end of the support 58 so as to horizontally extend in parallel with the glass sheet conveyance direction. The link 68 has a left end in FIG. 3 coupled to the link 70 through a pin 71 and a right end in FIG. 3 coupled to the link 72 through a pin 73. The link 74 has a left end in FIG. 3 coupled to the link 70 through a pin 75 and a right end in FIG. 3 coupled to the link 72 through the pin 77.

The link 72 has a lower portion provided with a tongue 78, which projects rearward and is coupled to a piston 61 of the air cylinder 60 through a pin 80. By this arrangement, the linkage 62 makes a movement by projecting and withdrawing the piston 61 of the air cylinder 60. Specifically speaking, when the piston 61 is projected as indicated by a solid line in FIG. 3, the linkage 62 rises. By the rising movement, the arm 66, which is coupled to the linkage through the pin 77, is moved from a standby position indicated by a chain double-dashed line to an upper left position by the pushing action of the pin 75 to be located at an initial position of commencement of the positioning operation indicated by a solid line. When the arm is located at the initial position, the front end 12A of the glass sheet 12 gets in contact with the pad 64. Conversely, when the piston 61 is withdrawn, the linkage 62 collapses as indicated by the chain double-dashed line in FIG. 3. By the collapsing movement, the arm 66 is moved from the initial position for commencement of the positioning operation indicated by the solid line to a lower right position to be returned to the standby position indicated by the chain double-dashed line. When the arm 66 is located at the standby position, the shuttle 40 shown in FIG. 1 can horizontally move without interference with the arm 66. When the arm 66 is located at the standby position indicated by the chain double-dashed line, the arm 66 gets away from the pin 75, and the arm is supported by a bolt 81 screwed in the link 68 and is slanted at a certain angle. The air cylinder 60 is mounted through a pin 83 to a bracket 82, which is fixed to the support 58. The air cylinder 60 is also controlled by the controller.

Figure 4:
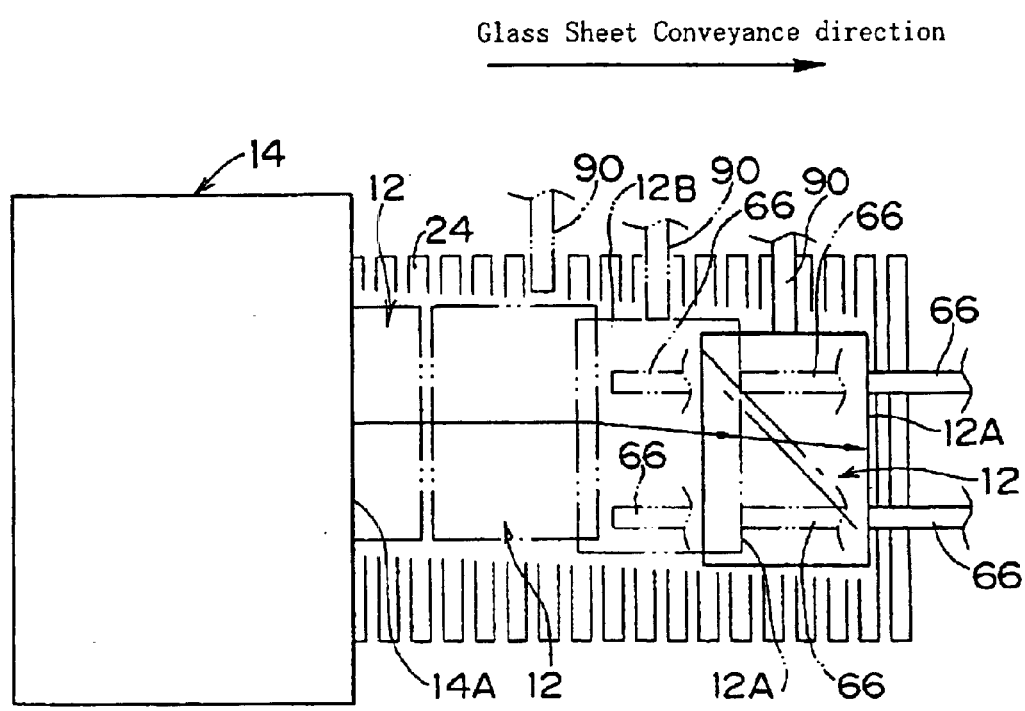
FIG. 4 is a schematic plan view showing an operation of the positioners.

There is a positioner 90, which is provided at a position adjacent the positioners 50 on one side of the roller conveyer 24 as shown in FIG. 1 and FIG. 4 to push an end of the glass sheet 12 in the transverse selection. The positioner 90 waits ready at a position in the vicinity of the outlet 14A of the heating furnace 14 as indicated by a chain double-dashed line in FIG. 4 when the glass sheet 12 is being heated in the heating furnace 14. The positioner 90 advances toward the glass sheet 12, moving at substantially the same speed as the glass sheet 12 carried out of the outlet 14A and in synchronism with the movement of the glass sheet in the glass sheet conveyance direction. The glass sheet 12 has the end 12B in the transverse direction pushed by the positioner 90, and consequently the glass sheet is shifted toward a direction perpendicular to the conveyance direction. As a result, the glass sheet 12 is positioned at the glass sheet standby position indicated by a solid line in FIG. 4 by the positioners 50 and 90. In other words, the positioners 50 determine the position of the glass sheet in the glass sheet conveyance direction, and the positioner 90 determines the position of the glass sheet in the direction perpendicular to the glass sheet conveyance direction.

Next, the function of the positioners 50 of the positioning apparatus 16 will be described. First, the positioners 50 are located at the positioner standby position as shown in FIG. 2 until the glass sheet 12 is conveyed to the outlet 14A of the heating furnace 14.

Figure 5:
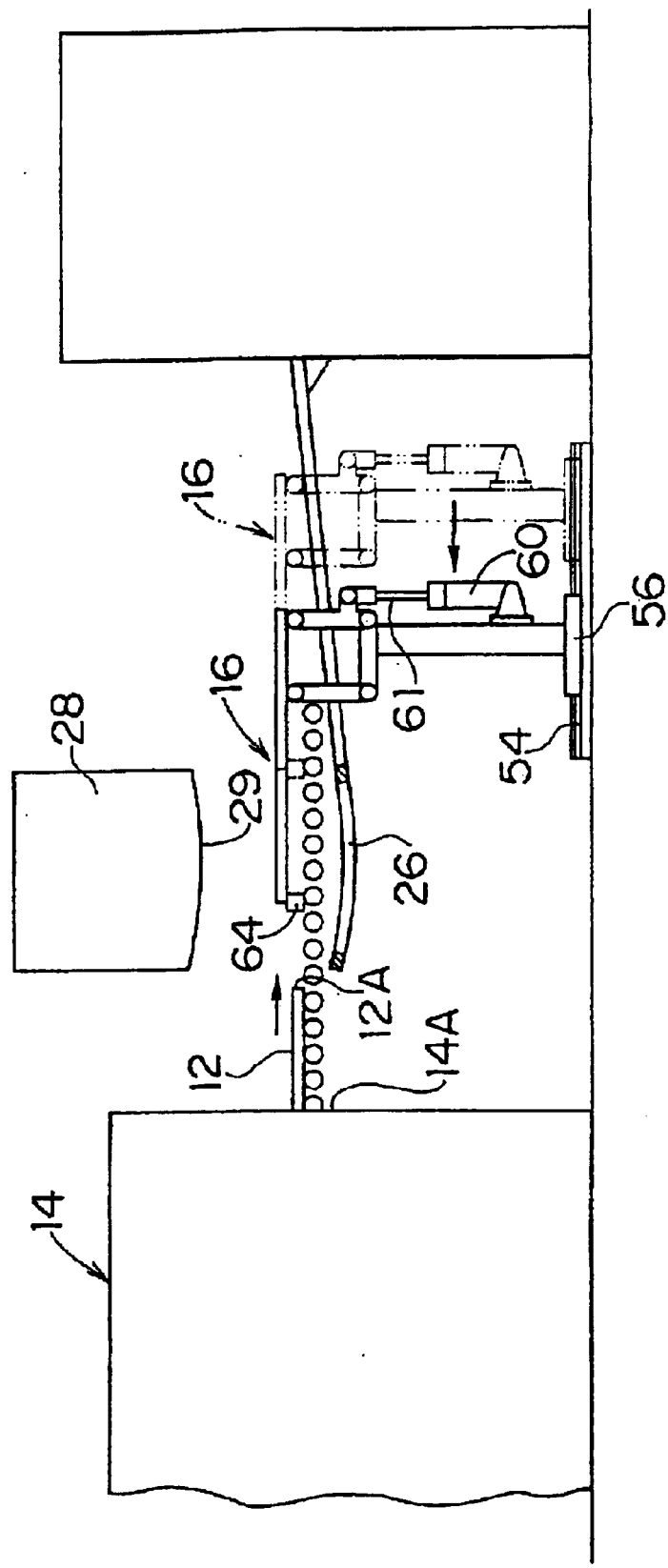
FIG. 5 is schematic view showing a positioning operation of a glass sheet by the positioners.

Next, when the glass sheet 12 is carried out of the outlet 14A toward the downstream direction as shown in FIG. 5, the pistons 61 of the air cylinders 60 are projected to locate the positioners 50 at the initial position for commencement of the positioning operation, and the unshown feed screw units are driven to move the positioners from the positioner standby position indicated by a chain double-dashed line in FIG. 5 to a pad initial position indicated by the solid line in this figure. At that time, the pads 64 confront the front end 12A of the glass sheet 12. The pads 64 are located under the mold 28 at that time. Thus, no moving space for the positioners 50 are required between the heating furnace 14 and the forming die 18.

Figure 6:
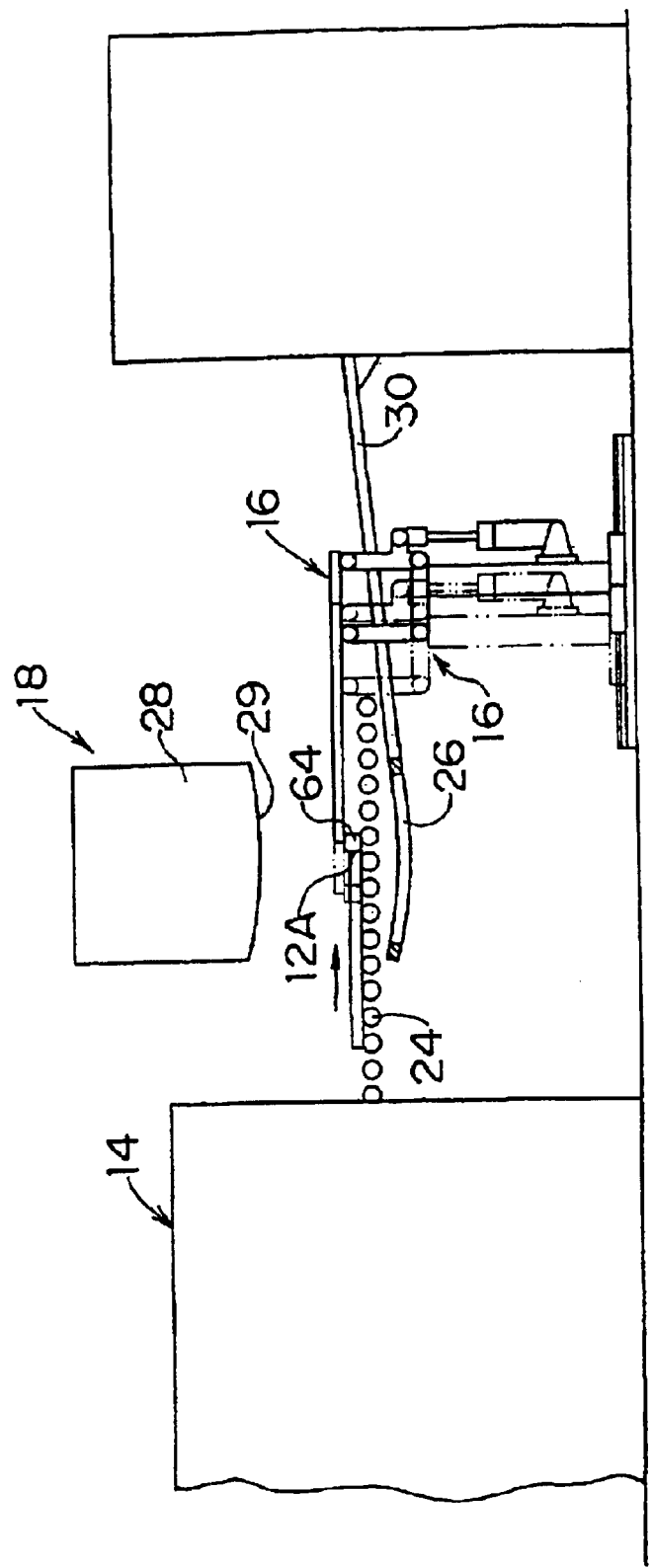
FIG. 6 is another schematic view showing the positioning operation of the glass sheet by the positioners.

Next, when the glass sheet 12 is further conveyed toward the downstream direction as shown in FIG. 6, the unshown feed screw units are reversely driven to move the positioners 50 from the pad initial position indicated by the chain double-dashed line in FIG. 6 to a glass sheet receiving position indicated by a solid line in this figure. Since the moving speed of the positioners 50 is set at a lower value than the glass sheet conveyance speed (the speed of the roller conveyer 24) at that time, the front end 12A of the glass sheet 12 gets in contact with the pads 64 during movement of the positioners. The difference between the glass sheet conveyance speed and the moving speed of the positioners 50 is set such that no impact is applied to the glass sheet 12 when the front end 12A of the glass sheet 12 gets in contact with the pads 64. Thus, the glass sheet 12 is positioned, being pushed by the positioners 50, without being damaged by the positioners 50. During positioning, the glass sheet 12 goes into a slide on the roller conveyer 24 because of the presence of the difference between the conveyance speed of the roller conveyer 24 and the moving speed of the positioners 50. The glass sheet 12 can prevent the surface from being damaged since the rollers forming the roller conveyer 24 are covered with a buffer material, such as heat-resisting unwoven cloth.

Figure 7:
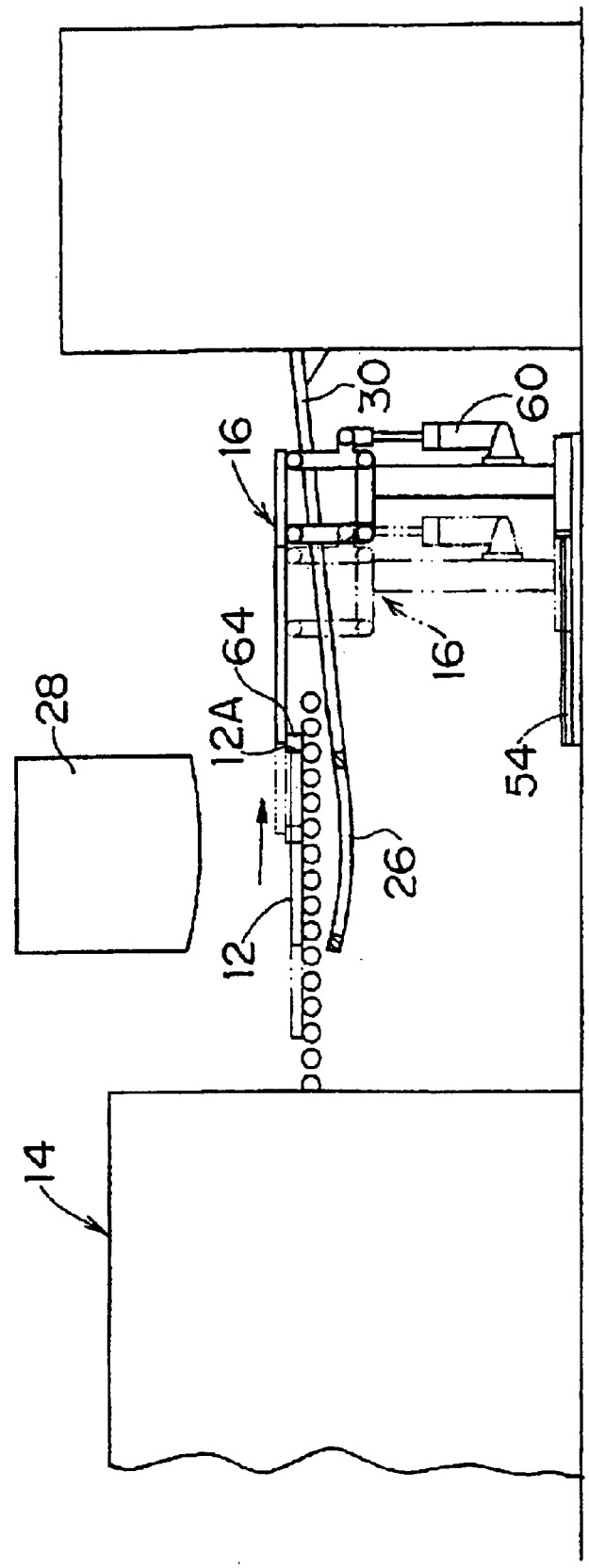
FIG. 7 is another schematic view showing the positioning operation of the glass sheet by the positioners.

When the glass sheet 12 has arrived at the glass sheet standby position shown in FIG. 7 with the glass sheet conveyance speed and the moving speed of the positioners being decelerated, the operation of the roller conveyer 24 and the movement of the positioner 50 are stopped. The glass sheet 12 is positioned at this position by the positioners 50 and the positioner 90 shown in FIG. 4.

Figure 8:
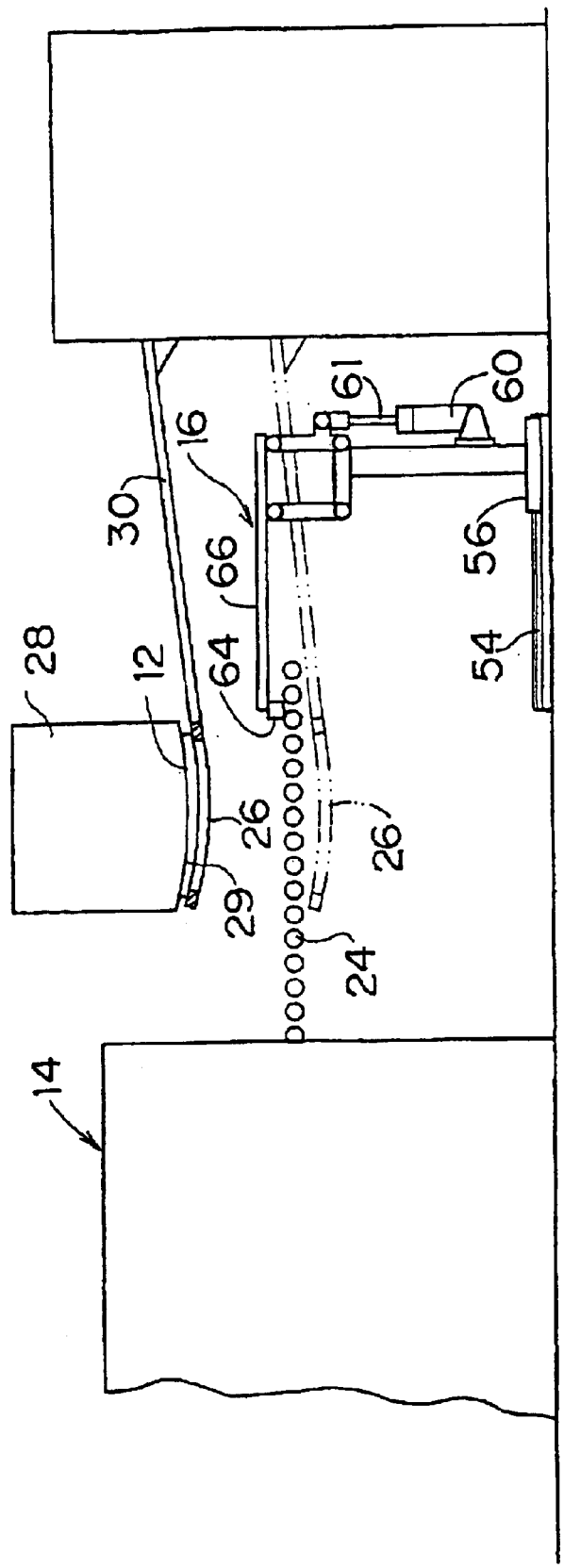
FIG. 8 is another schematic view showing the positioning operation of the glass sheet by the positioners.

After that, the glass sheet 12, which is located at the glass sheet standby position, is pressed against the mold 28 by the upward movement of the press ring 26 to be bent as shown in FIG. 8. Then, the positioners 50 are returned to the positioner standby position shown in FIG. 2, and the press ring 26 is moved toward the air-cooling and tempering apparatus 20. This is the function of the positioners 50.

Figure 9:
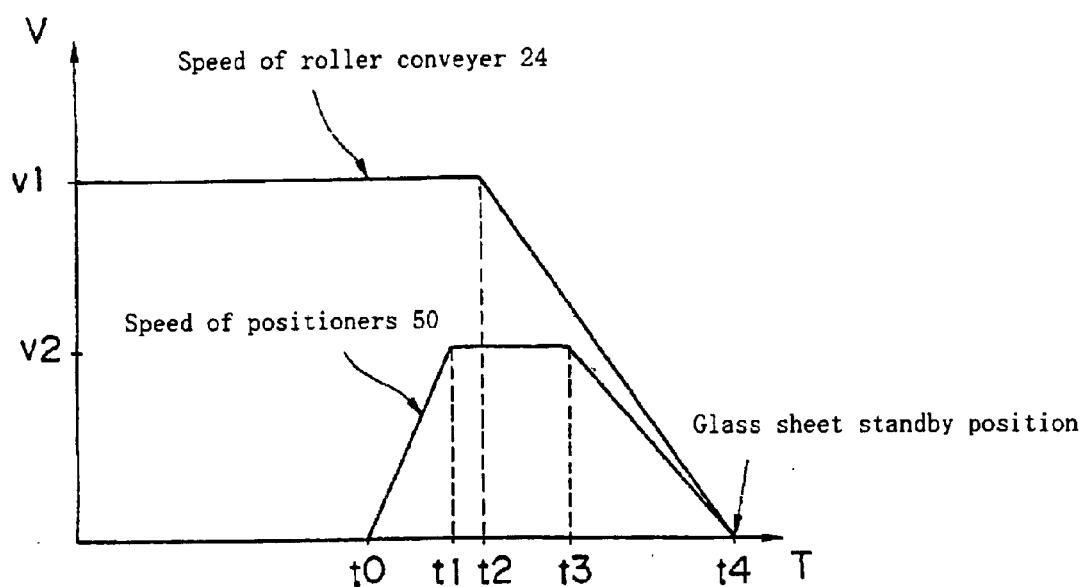
FIG. 9 is a graph showing the speeds of a roller conveyer and the positioners according to the present invention.

FIG. 9 is a graph showing changes in the speed of the roller conveyor 24 (the glass sheet conveyance speed) and the speed of the positioners 50. In FIG. 9, the vertical line indicates speeds V (mm/sec), and the horizontal axis indicates lapsed times T (sec). According to this figure, although the positioners 50 rest at a time t0 when the positioners are located at the pad initial position (see FIG. 5), the roller conveyor 24 conveys the glass sheet 12 at a speed of v1 at that time. After that, the positioners 50 start accelerating and move toward the glass sheet conveyance direction up to a time t1, move at an uniform speed from the time t1 to a time t3 and start decelerating at the time t3, finally stopping at a time t4 (at the glass sheet standby position). On the other hand, the roller conveyor 24 start decelerating at a time t2, finally stopping at a time t4 (at the glass sheet standby position) as well.

By carrying out such control that makes the speed of the roller conveyor 24 higher than the speed of the positioners 50 at all times, the difference between both speeds causes the front end 12A of the glass sheet 12 to be pressed against the positioners 50 as shown in FIG. 6 and FIG. 7. In FIG. 9, the front end 12A of the glass sheet 12 gets in contact with the positioners 50 in the vicinity of the time t3. Thus, the glass sheet 12 is subjected to the positioning by the positioner 50. When the positioners 50 have arrived at the glass sheet standby position, the glass sheet 12 is properly positioned there.

As explained, the glass sheet bending apparatus 10 with the positioning apparatus 16 applied thereto can bend the glass sheet with the temperature of the glass sheet being restrained from lowering since the positioners 50 get in contact with the front end 12A of the glass sheet 12 in the conveyance direction to carry out the positioning of the glass sheet. Thus, the glass sheet heated in the heating furnace 14 can be bent in excellent fashion.

Although the glass sheet bending apparatus 10 referred to in the explanation with respect to the embodiment is an out-of-furnace bending apparatus with the forming die 18 provided outside the heating furnace 14, the present invention is also applicable to an in-furnace bending apparatus with the forming die 18 provided in the heating furnace 14

As explained, the present invention can shorten the moving distance of a glass sheet from the heating furnace to the position just under the forming die by making the arms of the positioners brought into contact with the front end of the glass sheet in the conveyance direction to carry out the positioning of the glass sheet. This arrangement can produce an excellent curved glass sheet having less optical distortion since the period of time that is required for the glass sheet to be carried out of the heating furnace and be bent can be shortened to realize the bending operation for the glass sheet with the glass sheet being kept at a high temperature. The positioning apparatus according to the present invention is not only applicable to the positioning of a heated glass sheet but also the positioning of other plate-shaped members (such as a metallic plate and a resin plate).

The entire disclosure of Japanese Patent Application No. 2001-138798 filed on May 9, 2001 including specification, claims, drawings and summary are incorporated herein by reference in its entirety.

What is claimed is:

1. A glass sheet bending apparatus comprising a heating furnace for heating a glass sheet up to a certain bending temperature, a mold having a certain bending shape, a roller conveyor for conveying the heated glass sheet, a positioning unit for positioning the conveyed glass sheet at a certain glass sheet standby position, and a press ring for pressing the conveyed glass sheet against the mold to bend the glass sheet after receiving the glass sheet at the glass sheet standby position;

wherein the positioning unit comprises a guide rail, a guide block slidably provided on the guide rail, a support provided on the guide block; a four-bar linkage provided to the support, an arm provided to the four-bar linkage so as to be able to extend in a horizontal direction; an air cylinder for changing a form of the four-bar linkage, and a controller for controlling an operation of the roller conveyor, a sliding movement of the guide block and an operation of the air cylinder;

the four-bar linkage comprises a first link fixed to the support, a second link coupled to one end of the first link with a pin, a third link coupled to one end of the second link with a pin, and a fourth link coupled to one end of the third link with a pin and to the other end of the first link with a pin;

the second link includes a tongue coupled to a piston of the air cylinder; and the controller operates the air cylinder to move the arm to a certain initial position for a positioning operation, moves the glass sheet in a conveyance direction thereof with a leading end of the arm kept in contact with a front end of the glass sheet and positions the glass sheet at a certain standby position.

2. The bending apparatus according to claim 1, wherein the mold is provided outside the heating furnace; and the roller conveyor conveys the glass sheet carried out of the heating furnace up to a position just under the mold.

3. The bending apparatus according to claim 1, wherein the controller controls a moving speed of the arm by the air cylinder such that the moving speed becomes slower than a conveyance speed of the roller conveyor, thereby positioning the glass sheet at the glass sheet standby position with the glass sheet kept slipping on the roller conveyor.

4. The bending apparatus according to claim 1, further comprising another positioning unit for offsetting the glass sheet in a direction perpendicular to the conveyance direction to position the glass sheet.

5. The bending apparatus according to claim 1, wherein the roller conveyor has rollers covered with heat-resisting unwoven cloth.

6. The bending apparatus according to claim 1, further comprising an air-cooling and tempering unit for air-cooling the bent glass sheet.

* * * * *